United States Patent
Imholt et al.

(10) Patent No.: US 8,491,292 B1
(45) Date of Patent: *Jul. 23, 2013

(54) ALIGNING NANOMATERIAL IN A NANOMATERIAL COMPOSITE

(75) Inventors: Timothy J. Imholt, Richardson, TX (US); James A. Pruett, Allen, TX (US); Jerry M. Grimm, Plano, TX (US); Christopher J. Gintz, Hilton Head Island, SC (US); Graham E. Gintz, Hilton Head Island, SC (US)

(73) Assignee: Raytheon Company, Waltham, MA (US)

( * ) Notice: Subject to any disclaimer, the term of this patent is extended or adjusted under 35 U.S.C. 154(b) by 1050 days.

This patent is subject to a terminal disclaimer.

(21) Appl. No.: 11/830,938

(22) Filed: Jul. 31, 2007

(51) Int. Cl.
B29C 35/00 (2006.01)

(52) U.S. Cl.
USPC ............. 425/174.6; 425/174.8 R; 264/437; 264/438

(58) Field of Classification Search
USPC ............. 425/174.6, 174.8 R; 264/438, 439, 264/437, 108
See application file for complete search history.

(56) References Cited

U.S. PATENT DOCUMENTS

| | | | | |
|---|---|---|---|---|
| 3,306,835 A * | 2/1967 | Magnus | .................. | 204/157.62 |
| 3,507,938 A | 4/1970 | Hundsdiecker | | |
| 5,196,212 A * | 3/1993 | Knoblach | .............. | 425/174.8 R |
| 5,298,203 A * | 3/1994 | Yoshida et al. | ................ | 264/439 |
| 5,580,512 A * | 12/1996 | Koon et al. | .................... | 264/438 |
| 6,033,198 A * | 3/2000 | Furlani et al. | ..................... | 425/3 |
| 7,244,373 B1 | 7/2007 | Anazawa et al. | ............. | 252/500 |
| 7,244,374 B2 | 7/2007 | Anazawa et al. | ............. | 252/500 |
| 7,247,670 B2 | 7/2007 | Malenfant et al. | ............ | 524/496 |
| 7,462,498 B2 | 12/2008 | Mao et al. | | |
| 7,468,315 B2 | 12/2008 | Buretea et al. | | |
| 7,491,428 B2 | 2/2009 | Smits et al. | | |
| 7,504,152 B1 | 3/2009 | Siegel et al. | | |
| 7,505,250 B2 | 3/2009 | Cho et al. | | |
| 2004/0099438 A1 | 5/2004 | Arthur et al. | | |
| 2004/0126526 A1 | 7/2004 | Parsonage et al. | | |
| 2005/0116336 A1 | 6/2005 | Chopra et al. | | |
| 2005/0238810 A1 | 10/2005 | Scaringe et al. | | |
| 2005/0275144 A1 * | 12/2005 | Muhe et al. | ................... | 266/216 |
| 2005/0287064 A1 | 12/2005 | Mayne et al. | | |
| 2006/0115640 A1 | 6/2006 | Yodh et al. | | |
| 2006/0275371 A1 | 12/2006 | Dai et al. | | |
| 2007/0129481 A1 | 6/2007 | Yamaguchi et al. | | |
| 2008/0176052 A1 | 7/2008 | Ma et al. | | |
| 2008/0202341 A1 | 8/2008 | Poole et al. | | |

FOREIGN PATENT DOCUMENTS

| | | |
|---|---|---|
| EP | 1 077 341 A2 | 2/2001 |
| JP | 2006-057129 | 3/2006 |
| WO | WO 00/34379 | 6/2000 |
| WO | WO 03/016048 A1 | 2/2003 |

(Continued)

OTHER PUBLICATIONS

U.S. Appl. No. 11/830,970 entitled, "*Making a Nanomaterial Composite*", 25 pages specification, claims and abstract, 3 pages of drawings, inventor Timothy J. Imholt, filed Jul. 31, 2007.

(Continued)

*Primary Examiner* — Dimple Bodawala

(74) *Attorney, Agent, or Firm* — Renner, Otto, Boisselle & Sklar, LLP

(57) ABSTRACT

Processing a composite material includes combining a nanomaterial with a matrix to yield a composite material. The nanomaterial comprises nanotubes. An electric current is applied to the composite material to align and disperse the nanotubes in the matrix.

9 Claims, 3 Drawing Sheets

FOREIGN PATENT DOCUMENTS

| WO | WO 2005/056645 A1 | 6/2005 |
|---|---|---|
| WO | WO 2005/075571 A1 | 8/2005 |
| WO | WO 2006/082436 A1 | 8/2006 |
| WO | WO 2006/104822 A2 | 10/2006 |

OTHER PUBLICATIONS

Harris, C., et al., "*The effect of changing nanotube length on the performance of single walled nanotubes polymer photovoltaic devices*", pp. 144-146, 2003.

Zhu, Jiang, et al., "*Improving the Dispersion and Integration of Single-Walled Carbon Nanotubes in Epoxy Composites through Functionalization*", Nano Letters, vol. 3, No. 8, 2003, pp. 1107-1113, 2003.

Bai, J.B., et al., "*Effect of the length and the aggregate size of MWNTs on the improvement efficiency of the mechanical and electrical properties of nanocomposites—experimental investigation*", Composites: Part A 34, Elsevier, www.elsevier.com/locate/composites, pp. 689-694, 2003.

Koerner, Hilmar, et al., "*Tuning Polymer Nanocomposite Morphology: AC Electric Field Manipulation of Epoxy—Montmorillonite (Clay) Suspensions*", Advanced Materials, 2004, 16, No. 4, pp. 297-301, Feb. 17, 2004.

Martin, C.A., et al., "*Electric field-induced aligned multi-wall carbon nanotube networks in epoxy composites*", Polymer 46 (2005), Elsevier, www.elsevier.com/locate/polymer, pp. 877-886, 2005.

Ras, Robin H.A., et al., "*Hollow Inorganic Nanospheres and Nanotubes with Tunable Wall Thicknesses by Atomic Layer Deposition on Self-Assembled Polymeric Templates*", Advanced Materials, 2007, 19, pp. 102-106.

U.S. Appl. No. 12/152,642 titled "*System and Methods of Dispersion of Nanostructures in Composite Materials*", by Timothy J. Imholt et al., 20 pages of specification, claims and abstract, 6 pages of drawings, May 14, 2008.

Notification of Transmittal of the International Search Report and the Written Opinion of the ISA, or the Declaration, for PCT/US2008/060027 (14 pages), dated Sep. 18, 2008.

U.S. Appl. No. 12/100,909 entitled, "*System and Method for Dispersing Nanostructures in a Composite Material*", 24 pages specification, claims and abstract, 2 pages of drawings, inventors Timothy J. Imholt, et al., Apr. 10, 2008.

USPTO, Nonfinal Office Action for U.S. Appl. No. 12/100,909, Feb. 19, 2010.

USPTO, Nonfinal Office Action for U.S. Appl. No. 12/100,909, Apr. 29, 2010.

USPTO, Nonfinal Office Action for U.S. Appl. No. 11/830,970, Sep. 23, 2010.

USPTO, Final Office Action for U.S. Appl. No. 12/100,909, Oct. 15, 2010.

USPTO, Advisory Action for U.S. Appl. No. 12/100,909, Dec. 29, 2010.

USPTO, Final Office Action for U.S. Appl. No. 11/830,970, Mar. 15, 2011.

*USPTO*, Advisory Action for U.S. Appl. No. 11/830,970, 3 pages, May 24, 2011.

* cited by examiner

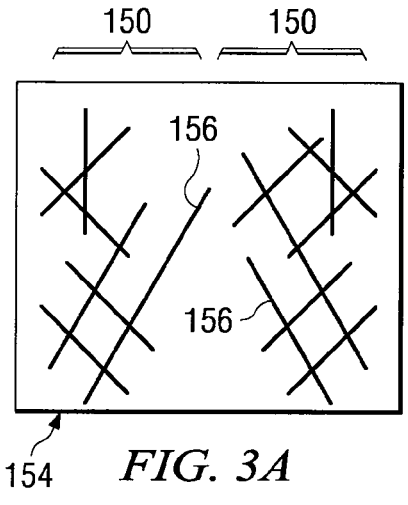
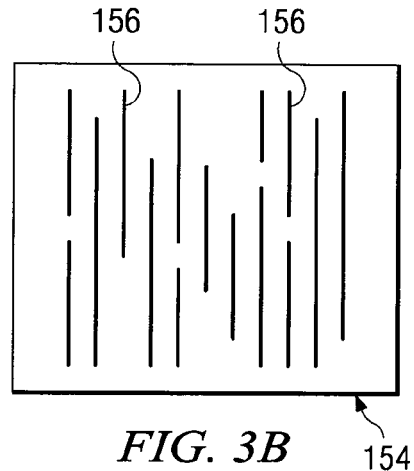
FIG. 3A  FIG. 3B
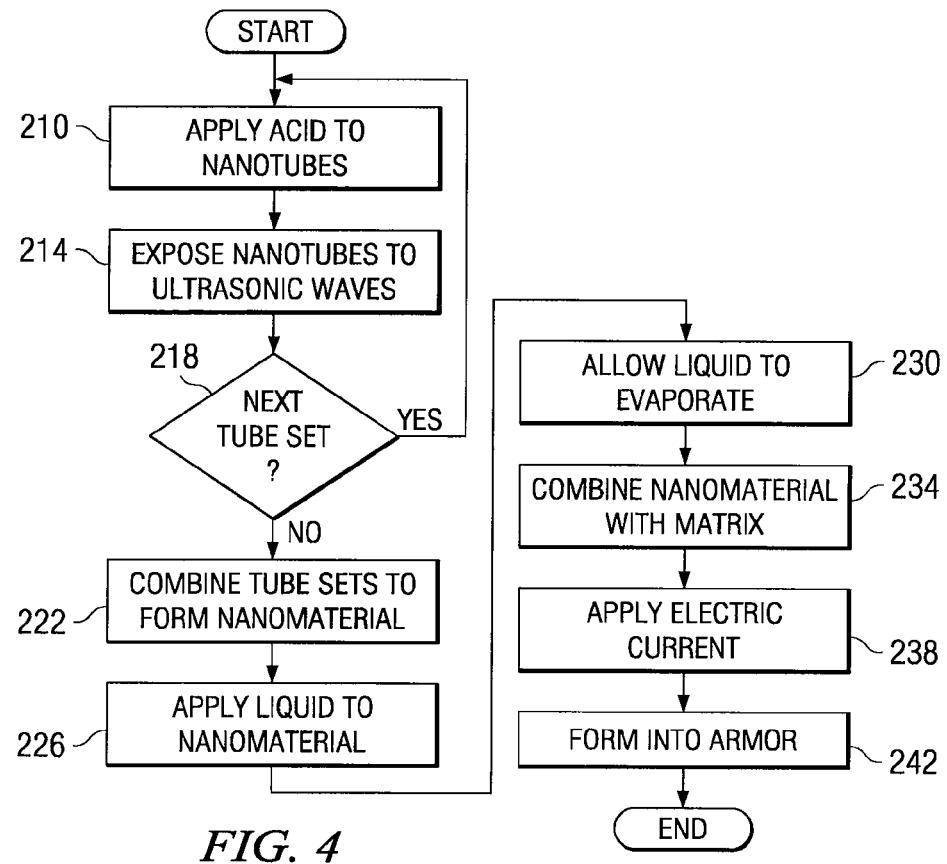
FIG. 4

ALIGNING NANOMATERIAL IN A NANOMATERIAL COMPOSITE

TECHNICAL FIELD

This invention relates generally to the field of composite materials and more specifically to aligning nanomaterial in a nanomaterial composite.

BACKGROUND

Composite materials may include a reinforcing material and a matrix. The reinforcing material and the matrix operate in a cooperative fashion such that the composite material benefits from properties of each. The reinforcing material strengthens the composite material, and the matrix surrounds and supports the reinforcing material.

SUMMARY OF THE DISCLOSURE

In accordance with the present invention, disadvantages and problems associated with previous techniques for aligning nanomaterial in a nanomaterial composite may be reduced or eliminated.

According to one embodiment of the present invention, processing a composite material includes combining a nanomaterial with a matrix to yield a composite material. The nanomaterial comprises nanotubes. An electric current is applied to the composite material to align and disperse the nanotubes in the matrix.

Certain embodiments of the invention may provide one or more technical advantages. A technical advantage of one embodiment may be that a composite material includes nanotubes of varying lengths. The varying lengths provide more uniform support in the material, which may strengthen the composite material.

Another technical advantage of one embodiment may be that an electric current is applied to a composite material comprising nanotubes and a matrix to create an electric field. The electric field disperses and aligns the nanotubes within matrix, which may strengthen the composite material.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3A illustrates an example of composite material with clumped nanomaterial;

FIG. 3B illustrates composite material with dispersed and aligned nanomaterial; and FIG. 4 illustrates an example of a method for generating composite material that may be performed by the system of FIGS. 1A and 1B.

DETAILED DESCRIPTION OF THE DRAWINGS

Embodiments of the present invention and its advantages are best understood by referring to FIGS. 1A through 4 of the drawings, like numerals being used for like and corresponding parts of the various drawings.

Figure 1A:
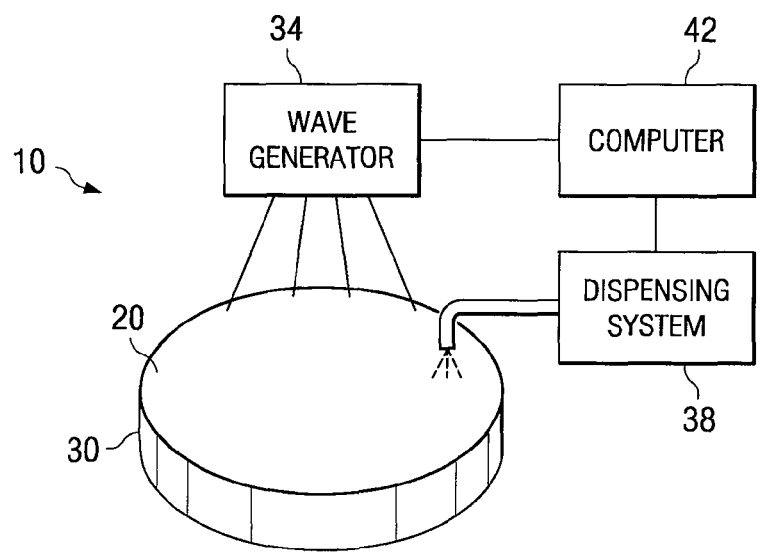
FIGS. 1A and 1B illustrate portions of an example of a system 10 for making a composite material 20.
Figure 1B:
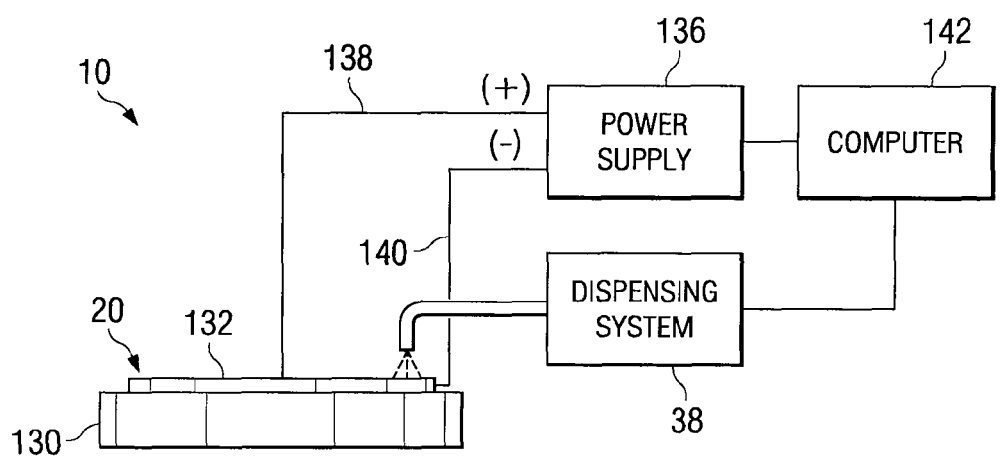

FIGS. 1A and 1B illustrate portions of an example of a system 10 for making a composite material 20. In the embodiment, system 10 makes composite material 20 that comprises nanomaterial and a matrix, where the nanomaterial comprises nanotubes. The nanotubes may have varying lengths that provide more uniform support in composite material 20, which may strengthen material 20. System 10 applies an electric current to composite material 20 as the matrix is curing to create an electric field. The electric field disperses and aligns the nanotubes within the matrix, which may also strengthen material 20.

FIG. 1A illustrates a portion that includes a receptacle 30, a wave generator 34, a dispensing system 38, and a computer 42 coupled as shown. FIG. 1B illustrates a portion that includes a base 130, a mold 132, a power supply 136, a positive lead 138, a negative lead 140, dispensing system 38, and computer 42 coupled as shown.

Referring to FIG. 1A, receptacle 30 receives composite material 20 and/or process material. Process material includes component material and added material. Component material includes components of composite material 20, such as the nanomaterial, matrix, or other material. Added material includes material added to the component material during the process of making composite material 20. The composite material 20 and/or process material may be mixed in receptacle 30.

Dispensing system 38 dispenses one or more process materials to make composite material 20. The materials may be dispensed in receptacle 30. In one embodiment, dispensing system 38 dispenses one or more liquids to the nanomaterial to prepare the nanomaterial. For example, acid is added to the nanotubes, and the nanotubes are exposed to ultrasonic waves for a particular duration to break the nanotubes. Exposure of different durations can yield nanotubes of different lengths, as described in more detail below.

Any suitable acid may be used, for example, an acid with a pH in the range of 0.1 to 6, such as in the range of 2 to 4, for example, a pH of approximately 3. Examples of such acids include hydrochloric acid. Any suitable amount of acid may be added. In one embodiment, the amount may be determined in accordance with the amount of nanomaterial. For example, for approximately 50 milligrams (mg) of nanomaterial, 75 to 100 cubic centimeters ($cm^3$) of acid may be applied.

Wave generator 34 generates ultrasonic waves to expose nanomaterial to ultrasonic waves. Any suitable frequency of ultrasonic waves may be used, for example, frequencies in the range 50 to 500 kilohertz (kHz), such as in the range 50 to 100 kHz, for example, a frequency of approximately 65 kHz.

Referring to FIG. 1B, base 20 supports mold 132, and may be substantially flat and horizontal to support mold 132. Mold 132 is a type of receptacle that forms composite material 20 into any suitable size, shape (for example, rectangular, square, or round), or thickness.

Power supply 136 provides an electrical current to positive lead 138 and negative lead 140. The current may have any suitable amperes, for example, in the range of 0.1 to 6 amperes (A), such as in the range of 2 to 4 A. Positive lead 138 and negative lead 140 apply the current to composite material 20, which creates an electric field at composite material 20. The electric field serves to align and disperse nanotubes within composite material 20. The electric field may have any suitable strength, such as in the range of 0.2 to 5 volts per centimeter (V/cm). In general, a stronger electric field may yield a harder composite material 20.

Figure 2A:
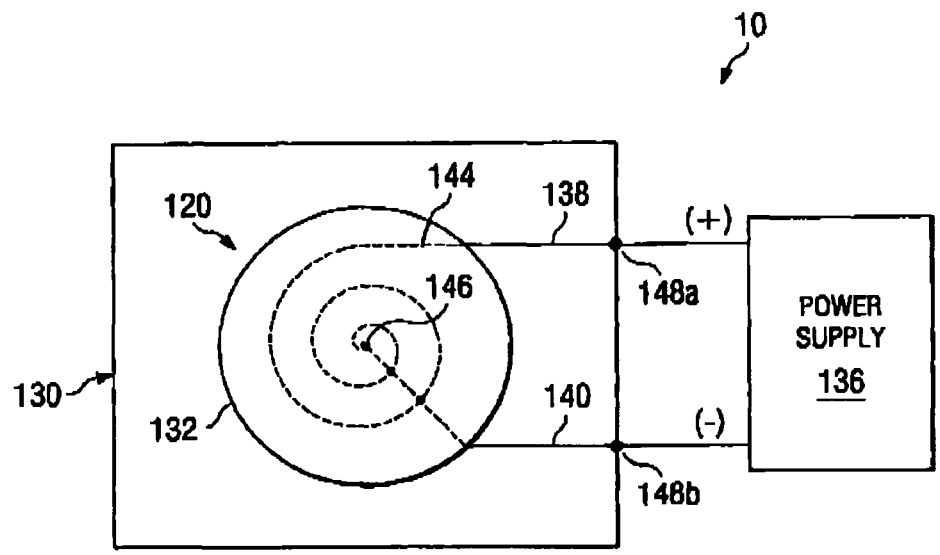
FIGS. 2A and 2B illustrate examples of top views of the system of FIGS. 1A and 1B that show how the current may be applied to composite material.
Figure 2B:
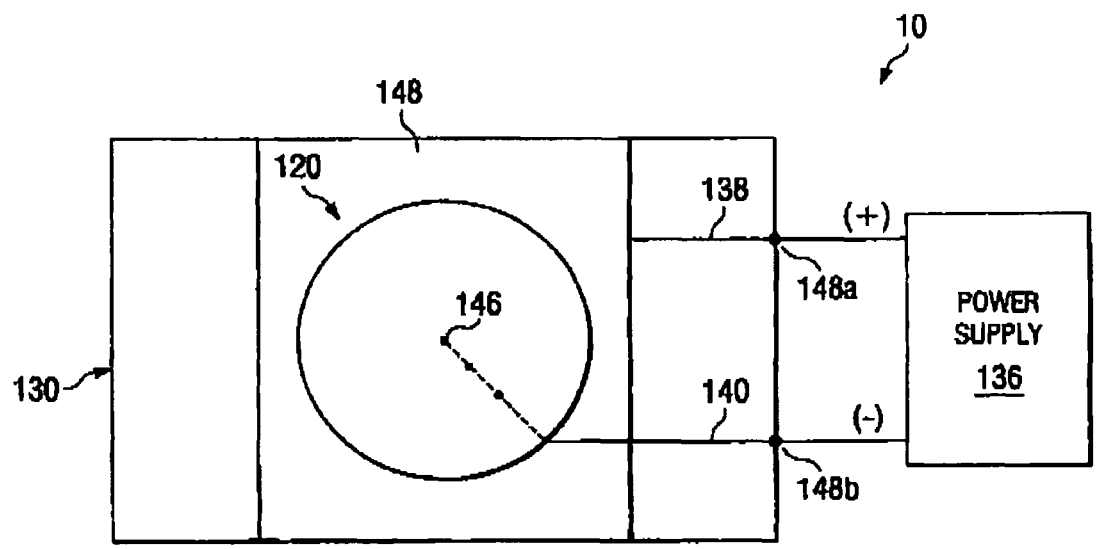

FIGS. 2A and 2B illustrate examples of top views of system 10 that show how the current may be applied to composite material 20. In FIGS. 2A and 2B, positive lead 138 and negative lead 140 are coupled to grounds 148a and 148b, respectively.

In FIG. 2A, a conductive strip 144 coupled to positive lead 138 surrounds mold 132. A conductor 146 coupled to negative lead 140 penetrates mold 132 at substantially the center of mold 132.

In FIG. 2B, a conductive plate 149 coupled to positive lead 138 is disposed along a surface of mold 132, for example, underneath mold 132. A conductor 146 coupled to negative lead 140 penetrates mold 132 at substantially the center of mold 132. Conductive strip 144, conductor 146, and conductive plate 149 may comprise any suitable conductive material, for example, a metal such as copper.

Referring back to FIG. 1B, dispensing system 38 adds one or more liquids to composite material 20 that may increase the mobility of nanotubes in the matrix during application of the electric current. Examples of suitable liquid include water, hydraulic fluid, and/or motor oil. The liquid is allowed to substantially evaporate into the surrounding atmosphere, which causes the nanotubes to either absorb or adsorb atoms, for example, oxygen and/or hydrogen atoms. Absorption is the internal storage of material within the cavity of a nanotube. Adsorption is the interstitial storage of material in interstitial channels of a nanotube rope. The atoms may increase the mobility of nanotubes during application of the electric current.

Any suitable amount of water may be added. In one embodiment, the amount may be determined in accordance with the amount of composite material 20. For example, for 50 grams (g) of composite material 20, 0.1 to 2 g of water may be applied.

Referring to FIGS. 1A and 1B, computer 42 manages the application of the electrical current and/or ultrasonic waves to composite material 20, and manages the dispensing of material by dispensing system 38. Computer 42 manages the amount, duration, and/or other parameters of the application and/or dispensing. Computer 42 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of power supply 136 and computer 42 may be performed by one component, or the operations of computer 42 may be performed by more than one component. Additionally, operations of system 10 may be performed using any suitable logic.

As used in this document, "each" refers to each member of a set or each member of a subset of a set.

FIG. 3A illustrates an example of composite material 20 with clumped nanomaterial 150. Composite material 20 comprises a nanomaterial 150 and a matrix 154. Nanomaterial 150 and matrix 154, even while mixed, may remain separate and distinct. Nanomaterial 150 and matrix 154 operate in a cooperative fashion such that composite material 20 includes properties of each. Typically, composite material 20 includes more matrix 154 than nanomaterial 150. For example, composite material 20 may comprise 0.1 to 3 percent nanomaterial 150, with matrix 154 making up substantially the rest of composite material 20.

Nanomaterial 150 includes nanostructures that have at least one dimension in the nanoscale range of approximately 1 to 100 nanometers (nm). Nanomaterial 150 operates as a reinforcement for composite material 20, and may enhance mechanical properties of composite material 20, for example, increase the hardness of material 20.

In one embodiment, nanomaterial 150 includes nanotubes 156. A nanotube is a nanostructure with a tube shape and a diameter in the nanoscale range. A nanotube may have length that is less than one thousand, ten thousand, or one hundred thousand nanometers.

A carbon nanotube (CNT) is an example of a nanotube. A carbon nanotube has one or more concentric cylinders of carbon atoms, or concentric graphite layers, where each cylinder has a diameter of approximately 0.2 to 5 nanometers. Carbon-carbon bonds of a carbon nanotube are $sp^2$ bonds, which are relatively strong bonds. Carbon nanotubes may have a tensile strength as high as 63 gigapascal (GPa), a high elastic modulus of approximately terapascal (TPa), and a low density 1.3 to 1.4 grams/meter$^3$ (g/m$^3$). Under very large tensile loads, carbon nanotubes typically undergo plastic deformation before breaking. Deformation begins at 5% of the total strain energy. When the tube is placed under enough strain energy, the tube will break and release the energy in the form of heat.

Carbon nanotubes include single-walled carbon nanotubes (SWNTs) and multi-walled carbon nanotubes (MWNTs). A single-walled carbon nanotube has a single cylinder and is typically closed at one or both ends. A single-walled carbon nanotube may be described as a one atom thick layer of graphite, or graphene, wrapped into a seamless cylinder. Single-walled carbon nanotubes typically have diameters from approximately one to two nanometers and lengths from approximately thousands to tens of thousands nanometers. Single-walled carbon nanotubes may be categorized as zigzag, armature, or chrial depending upon how the graphene sheet is rolled.

Single-walled carbon nanotubes have a large intratube binding energy and tend to form clusters referred to as ropes. The ropes are twists of 10 to 50 nanotubes tangled together. The tubes are held together with a Van der Waals force equivalent to approximately 0.5 electronvolt/nanometer (eV/nm).

Single-walled carbon nanotubes may be either conductors or semiconductors. Armature nanotubes are conductors, and the others are typically semiconductors. Single-walled nanotubes have electrical current densities in the region of that of copper.

Multi-walled carbon nanotubes have two to hundreds of concentric cylinders, or graphite layers. Double-walled carbon nanotubes and triple-walled carbon nanotubes have diameters from approximately three to ten nanometers and lengths up to approximately one micrometer.

The distance between graphite layers is approximately the same as the distance between graphene layers in the more common allotrope of carbon. The inner-layer distance gives multi-walled carbon nanotubes approximately the same electrical conductivity as graphene.

Nanotubes 156 may be raw or purified. Nanotubes 156 may comprise nanotubes other than carbon nanotubes. Examples of other types of nanotubes include boron nitride, copper sulfide, and other nanotubes.

Matrix 154 surrounds and supports the position of nanomaterial 150. Examples of matrix 154 include epoxy material, polystyrene, polybutadiene, polycarbonate, ceramics, and/or glass. Epoxy comprises a thermosetting epoxide polymer that cures when mixed with a catalyzing agent.

FIG. 3B illustrates composite material 20 with dispersed and aligned nanomaterial 150. The dispersion results from an electric current applied to composite material 20 by system 10.

Dispersion measures the uniformity of a reinforcement (for example, nanomaterial 150) in matrix 154 per unit volume. More uniformly mixed composite material 20 has more uniform properties throughout composite material 20. Non-uniformly mixed regions of composite material 20 typically behave differently. If a reinforcement is unevenly dispersed in matrix 24, there may be a weak point in composite material 20, yielding an unpredictable density of material 20.

Alignment refers to the alignment of nanotubes 156 with respect to each other. More aligned nanotubes 156 are more closely parallel to each other than less aligned nanotubes 156.

FIG. 4 illustrates an example of a method for generating composite material 20 that may be performed by system 10 of FIGS. 1A and 1B. Steps 210 and 214 are performed in order to generate tube sets that include nanotubes 56 of different lengths. For example, a first tube set includes tubes of approximately a first length, and a second tube set includes tubes of approximately a second length different from the first length.

An acid is applied to a tube set comprising unbroken nanotubes at step 210. The tube set is exposed to ultrasonic waves for a specific duration at step 214 to break the nanotubes. Different durations can yield tubes of different lengths. Accordingly, different durations can be used at each iteration of steps 210 and 214 in order to yield tube sets of different lengths. Any suitable durations may be used, for example, durations of to 36 hours, such as 10 to 24 hours. For example, durations of less than ten hours, such as five hours, two hours, and thirty minutes may be used.

Steps 210 and 214 need not be performed if nanotubes of different lengths are available. For example, nanotubes of different lengths may be grown. Examples of techniques of growing nanotubes of different lengths include chemical vapor deposition, laser ablation, and other suitable techniques.

The tube sets are combined at step 222 to yield nanomaterial 50. Liquid is applied to nanomaterial 50 at step 226. The liquid is allowed to substantially evaporate into the surrounding atmosphere at step 230. Evaporation causes nanotubes 56 to either absorb or adsorb atoms, for example, oxygen and hydrogen atoms.

The nanomaterial is combined with uncured matrix 54 at step 234 to yield composite material 20. An electric current is applied to composite material 20 at step 238 to create an electric field. Electric current is passed uniformly through composite material 20 as matrix 54 cures to disperse nanotubes 56 in matrix 54. Nanotubes conduct electricity and in some cases build up a capacitance, and disperse and align along the electric field lines. The electric field holds nanotubes 56 in a dispersed position that prevents re-clumping. The electric current is applied until the composite material 20 cures and matrix 54 holds nanotubes 56 into place. In general, a stronger electric field may yield a harder composite material 20. In general, the more uniform the electric field, the better the dispersion alignment.

The electropheric mobility $\mu$ may be calculated from the Lorentz force resulting from the electric field and the electrical force corresponding to the matrix. The Lorentz force $F_L$ is given by:

$$F_L = qE$$

where q is the charge carried by the nanotubes, and E is the electric field.

The Lorentz force $F_L$ is countered by the frictional force $F_{fr}$, given by:

$$F_{fr} = vf$$

where v is the velocity of the nanotubes, and f is the coefficient of friction of the matrix. Thus:

$$qE = vf$$

The electropheric mobility $\mu$ of a non-conductive matrix is:

$$\mu = v/E = q/f$$

Mobility $\mu$ may also be given by:

$$\mu = (\varepsilon \varepsilon_o \zeta)/\eta$$

where $\varepsilon$ is the dielectric constant of the matrix, $\varepsilon_o$ is the permittivity of free space, $\zeta$ is the surface potential of the nanotubes, and $\eta$ is the viscosity of the matrix.

The storage of atoms at step 230 allows for more free movement of nanotubes 56 during the application of the electric current at step 238. Internal storage causes the nanotubes 56 to swell, and interstitial storage causes the ropes to swell. Application of the current causes nanotubes 56 to build up charge, which heats nanotubes 56. The heat causes the gaseous species to out gas from nanotubes 56, which causes pockets of gas in matrix 54. The gas pockets lower friction, which allows nanostructures 56 to move more freely in matrix 54 and become more dispersed and aligned. The pockets of gas in matrix 54 out gas during the curing process.

The current may be applied for any suitable duration. In one embodiment, the duration may be determined in accordance with the curing time of the matrix. For example, current may be applied when the matrix starts to cure until when the matrix is substantially cured. Examples of these durations are in the range of 2 to 36 hours, such as 10 to 24 hours.

Composite material is used to form armor at step 242. In one embodiment, the armor may include multiple layers, where one or more layers of the multiple layers comprises composite material 20.

Armor is covering intended to protect a target (such as an object or person) from harm, and may be used in combat or law enforcement situations. Harm may come from faster moving ballistic harm (such as bullets, shrapnel, or improvised explosive devices) or slower moving non-ballistic harm (such as knives). Ballistic armor protects a target from ballistic harm, and non-ballistic armor protects the target from non-ballistic harm. Examples of armor include personal armor intended to protect a human from harm (for example, a bulletproof vest) and vehicle armor intended to protect a vehicle from harm.

Armor may comprise one or more layers. A layer of the one or more layers may comprise composite material 20. The fibrous nature of nanotubes 56 of nanomaterial 50 localizes damage to armor. Longer nanotubes 56 carry the energy of the impact away from the impact area, creating less temporary cavitation. If nanotubes 56 are more aligned and better dispersed, the effect is more pronounced. Other layers may comprise steel (such as rolled homogenous armor (RHA)), ceramics, or other suitable material.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a composite material includes nanotubes of varying lengths. The varying lengths provide more uniform support in the material, which may strengthen the composite material.

Another technical advantage of one embodiment may be that an electric current is applied to a composite material comprising nanotubes and a matrix to create an electric field. The electric field disperses and aligns the nanotubes within matrix, which may strengthen the composite material.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system for processing a composite material, comprising:
   a mold operable to support the composite material comprising a nanomaterial and a matrix, the nanomaterial comprising a plurality of nanotubes;
   a conductive strip disposed underneath the mold in a spiral pattern; and
   a plurality of leads coupled to the mold and comprising: a first lead coupled to the conductive strip; and a second lead penetrating the mold; a power supply operable to provide an electrical current to the plurality of leads for creating an electric field at the composite material such that the plurality of leads operable to align and disperse the plurality of nanotubes in the matrix.

2. The system of claim 1, wherein the plurality of nanotubes comprises a plurality of carbon nanotubes.

3. The system of claim 1, wherein the plurality of nanotubes comprises a plurality of first nanotubes and a plurality of second nanotubes, the plurality of first nanotubes and the plurality of second nanotubes having different lengths.

4. The system of claim 1, the one or more leads operable to apply the electrical current by applying the electrical current in the range of 0.1 to 6 amperes to the composite material until the composite material cures.

5. The system of claim 1, further comprising a dispensing system operable to apply liquid to the nanomaterial, the liquid allowed to substantially evaporate.

6. The system of claim 1, further comprising a dispensing system operable to apply water to the nanomaterial, the water allowed to substantially evaporate.

7. The system of claim 1, further comprising a wave generator operable to break the nanotubes using a plurality of ultrasonic waves.

8. The system of claim 1, further comprising a wave generator operable to:
   yield one or more nanotubes of a first length by exposing a first set of nanotubes to a plurality of ultrasonic waves for a first duration; and
   yield one or more nanotubes of a second length different from the first length by exposing a second set of nanotubes to the ultrasonic waves for a second duration different from the first duration, the plurality of nanotubes comprising the first and second sets of nanotubes.

9. The system of claim 1, further comprising a computer operable to manage application of the electric current until the composite material cures.

* * * * *